United States Patent [19]

Bernstein

[11] Patent Number: 5,390,169
[45] Date of Patent: Feb. 14, 1995

[54] ROUTING TO INTELLIGENCE

[75] Inventor: Lawrence Bernstein, Short Hills, N.J.

[73] Assignee: AT&T Corp., Murray Hill, N.J.

[21] Appl. No.: 75,977

[22] Filed: Jun. 11, 1993

[51] Int. Cl.$^6$ ............... H04M 7/10; H04Q 3/76; H04Q 11/04

[52] U.S. Cl. ............... 370/55; 370/56; 370/60.1; 370/94.2; 379/269; 379/334

[58] Field of Search ............... 370/54, 55, 56, 58.1, 370/60, 60.1, 94.1, 94.2, 58.2, 58.3; 379/258, 268, 269, 333, 334, 49, 220, 221, 271, 272, 273

[56] References Cited

U.S. PATENT DOCUMENTS

| | | | |
|---|---|---|---|
| 4,956,841 | 9/1990 | Judeinstein et al. | 370/94.1 |
| 5,058,108 | 10/1991 | Mann et al. | 370/94.1 |
| 5,072,441 | 12/1991 | Szwarc | 370/60 |
| 5,113,499 | 5/1992 | Ankney et al. | 370/94.1 |
| 5,115,427 | 5/1992 | Johnson, Jr. et al. | 370/60 |
| 5,130,984 | 7/1992 | Cisneros | 370/60 |

OTHER PUBLICATIONS

A. G. Fraser, "Early Experiments with Asynchronous Time Division Networks," *IEEE Network*, Jan. 1993, pp. 12–26.

M. Fujioka et al, "Globalizing IN for the New Age," *IEEE Communications Magazine*, Apr. 1993, pp. 54–60.

M. E. Anagnostou et al, "Economic Evaluation of a Mature ATM Network," *IEEE Journal on Selected Areas in Communications*, vol. 10, No. 9, Dec. 1992, pp. 1503–1509.

J. McQuillan, "Doing Business Electronically: The Missing Link in ATM," *Business Communications Review*, vol. 23, No. 4, Apr. 1993, pp. 10–12.

C. A. Robinson, Jr., "Radical Telephone Graps Huge Bandwidth Promise," *Signal*, Mar. 1993, pp. 14–17.

*Primary Examiner*—Alpus Hsu
*Attorney, Agent, or Firm*—Ronald D. Slusky

[57] ABSTRACT

In a telecommunications network outgoing calls from a particular subscriber location for each of a plurality of telecommunications applications are delivered via a single access link to a single point of distribution through which the subscriber location is caused to be connected, as a function of the telecommunications application type, to an appropriate intelligent network element (INE) server. Additionally, incoming calls of the various application types and directed to a particular directory number are delivered to a single point of collection associated with its NPA-NNX and connections for those calls are caused to be made from the point of collection to an appropriate INE server, as a function of the telecommunications application type and the directory number in question. Communications within the network are by way of asynchronous transfer mode (ATM) cells.

24 Claims, 8 Drawing Sheets

FIG. 5

| LOCATION | TERMINAL DEVICE ($\widehat{OE_i}$) | RTI DIRECTORY NUMBER | SERVER DIRECTORY NUMBER | APPL. | ROUTE TO/ INCOMING | ROUTE TO/ OUTGOING | FX | E911 SERVER | WIRETAP ? |
|---|---|---|---|---|---|---|---|---|---|
| 11-1 | 11-11 | 908-949-6111 | 908-615-1236 | VIDEO | COLL 520 | VID. SW 55 | — | — | — |
| | 11-12 | 908-949-6111 | 908-949-6111 | POTS | CO. SW 45 | CO. SW 45 | — | — | — |
| | 11-14 | 908-949-6111 | 908-957-8823 | DATA | COLL 820 | COLL 820 | — | — | — |
| 11-2 | 11-21 | 908-949-7222 | 908-834-0166 | VIDEO | VID. SW 65 | COLL 620 | — | — | — |
| | 11-22 | 908-949-7222 | 908-949-7222 | POTS | CO. SW 45 | CO. SW 45 | — | — | — |
| | 11-23 | 908-582-7678 | 908-582-7678 | ISDN | — | CO. SW 75 | — | CO. SW 45 | — |
| 11-N | 11-N2 | 908-949-8333 | 908-949-8333 | POTS | CO. SW 45 | CO. SW 45 | — | — | 908-555-8282 |
| ----- | ----- | ----- | ----- | ----- | ----- | ----- | ----- | ----- | ----- |

NUMBER TRANSLATION TABLE OF RTI FACILITY 70

| LOCATION | TERMINAL DEVICE ($OE_i$) | RTI DIRECTORY NUMBER | SERVER DIRECTORY NUMBER | APPLICATION | ROUTE TO/ INCOMING | ROUTE TO/ OUTGOING | FX | E911 SERVER | WIRETAP ? |
|---|---|---|---|---|---|---|---|---|---|
| ---- | ---- | ---- | ---- | ---- | ---- | ---- | ---- | ---- | ---- |
| 11-2 | 11-23 | 908-582-7678 | 908-582-7678 | ISDN | CO SW 75 | --- | DIST410/D | --- | --- |
| ---------- | ---------- | ---------- | ---------- | ---------- | ---------- | ---------- | ---------- | ---------- | ---------- |

ROUTING TO INTELLIGENCE

BACKGROUND OF THE INVENTION

The present invention relates to telecommunications.

For most of its history, telecommunications was limited to the provision of a single telecommunications "application"—so-called plain old telephone service, or POTS. Within the last thirty years or so, however, a wide array of new telecommunications applications have been introduced with yet others being planned for implementation within this decade and beyond. Thus the range of current and future telecommunications applications includes not only POTS, but facsimile, cash machine and lottery telecommunications applications, access to computers, video to the home, and telephone-network-based games, as well as a variety of features that can be implemented for various of the telecommunications applications, such as call waiting, calling number ID, and speed calling.

The aforementioned and other telecommunications applications are realized by such telecommunications "services" as basic voiceband switching, packet switching, message switching, frame relay, SMDS and call switching (such as the so-called asynchronous transfer mode, or ATM).

SUMMARY OF THE INVENTION

It is a straightforward matter to provide a subscriber location with access to different telecommunications applications by assigning to that location directory numbers supported by each of a plurality of so-called intelligent network element (INE) servers capable of supporting respective telecommunications applications. The telecommunications network's numbering plan will thereby cause calls directed to those various directory numbers to be routed to the appropriate INE server and, thence, to the appropriate terminal device, e.g., POTS telephone set, cash machine, video terminal or personal computer, at the subscriber location.

I have recognized, however, that this approach is less than optimal.

In accordance with the present invention, incoming calls of various application types are directed to a single directory number, thereby causing them to be delivered to a single point of collection associated with a portion of that dialed directory number—illustratively the six digits comprising its numbering plan area (or "area code") and exchange. Connections for those calls are thereupon caused to be made from the point of collection to an appropriate INE server, as a function of the telecommunications application type and the directory number in question. Advantageously, outgoing calls may be routed from the servers to the destination locations via the opposite route, i.e., via the point of collection and thence out onto an appropriate telecommunications network, e.g., POTS, video, etc.

In preferred embodiments, communications within the network are in an asynchronous transfer mode (ATM) format.

In a telecommunications network implementing the principles of the invention, one way to connect the various terminal devices at a particular subscriber location to the respective INE servers is via respective ohmic or photonic links. Advantageously, however, the present invention can be used in conjunction with the invention set forth in my co-pending U.S. patent application Ser. No. 08/075,978 filed of even date herewith and assigned to the same assignee. In accordance with that arrangement, outgoing calls from a particular subscriber location for each of a plurality of telecommunications applications are delivered to a single point of distribution through which the subscriber location is caused to be connected, as a function of the telecommunications application type, to an appropriate INE server.

In preferred embodiments, the establishment of connections through both the point of distribution and the point of collection is carried out using a common number translation table which stores, for each subscriber location directory number, an identification of the appropriate INE server for each type of telecommunications application.

Other aspects and features of the invention are described hereinbelow.

BRIEF DESCRIPTION OF THE DRAWING

FIGS. 5 and 6 depict the contents of number translation tables contained within two of the RTI facilities;

DETAILED DESCRIPTION

Figure 1:
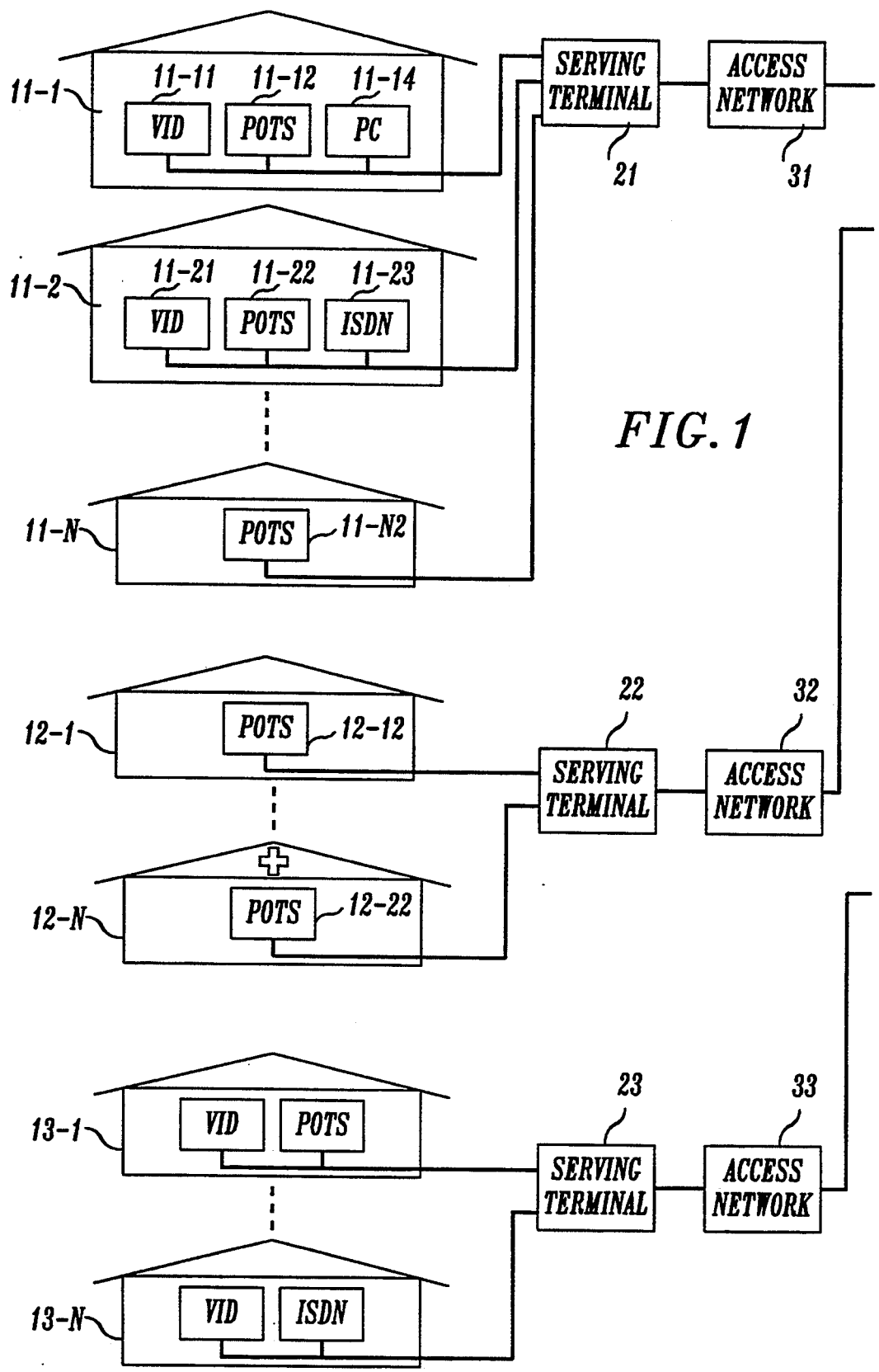
FIGS. 1 and 2, when arranged as shown in FIG. 3, comprise a block diagram of a telecommunications network embodying the principles of the invention.
Figure 2:
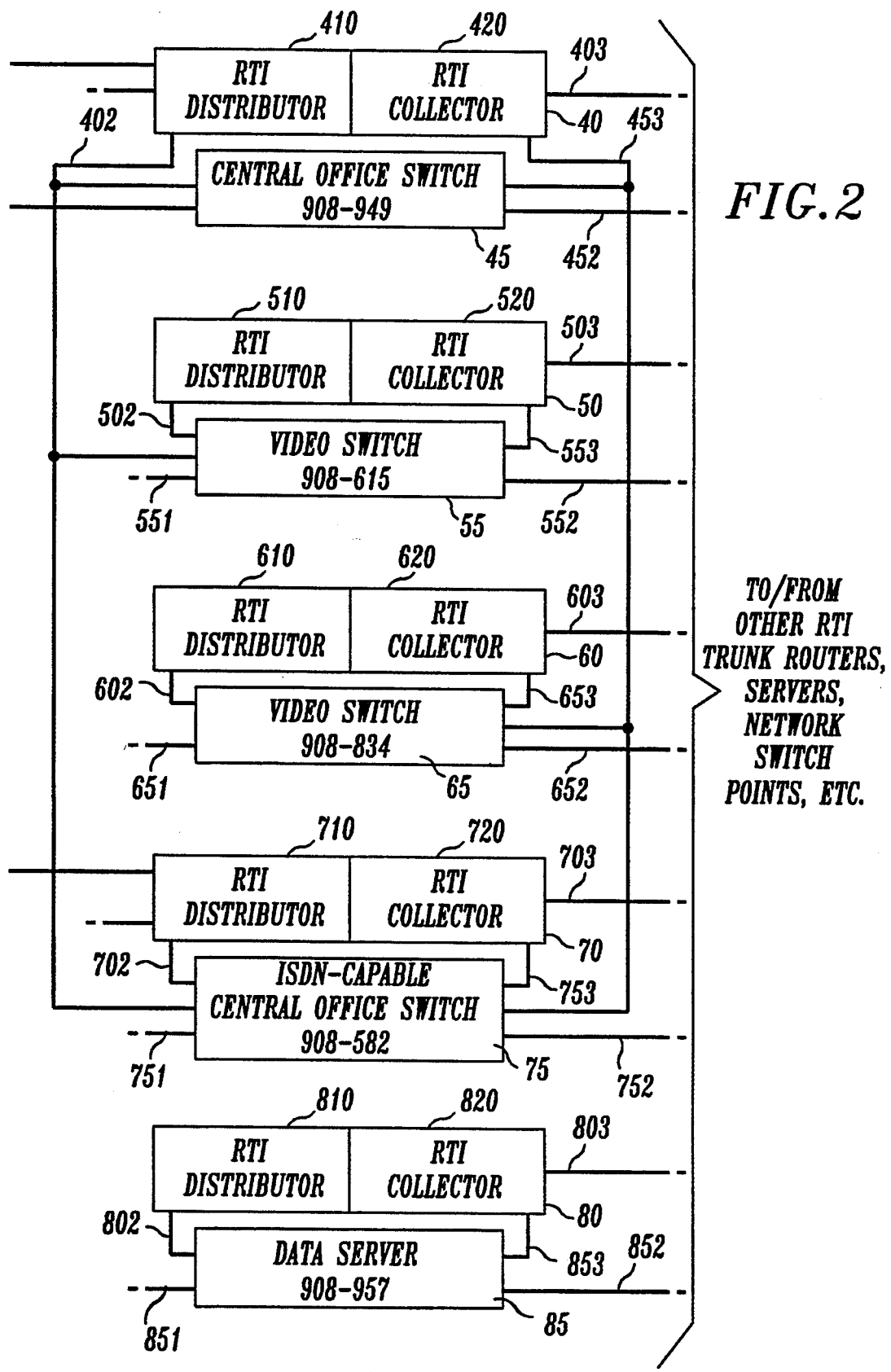
Figure 3:
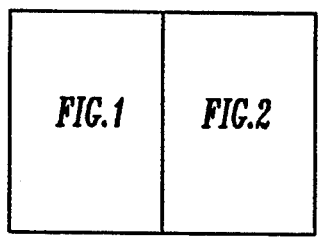

An exemplary portion of an overall telecommunications network embodying the principles of the invention is shown in FIGS. 1 and 2, when arranged as shown in FIG. 3. In accordance with prior art practice, particular subscriber locations, typified by subscriber locations 12-1 through 12-N, are provided with standard, or POTS, telephony by POTS central office switch 45. The terminal devices within subscriber locations 12-1 and 12-N are conventional analog telephone sets 12-12 and 12-22 which are connected to central office switch 45 via serving terminal 22 and access network 32, which may include various cross-connected access network segments—so-called feeder pairs and distribution pairs. Alternatively, access network 32 may comprise, for example, a subscriber loop carrier (SLC) system either of a type already widely deployed throughout the telecommunications infrastructure or of the type disclosed in the co-pending patent applications of T. M. Daugherty et al, Ser. Nos. 08/033,477 and 08/033,478, filed Mar. 18, 1993, both now abandoned and hereby incorporated by reference. Access networks 31 and 33 discussed hereinbelow are also illustratively of the type described in those patent applications.

Other subscriber locations, illustratively subscriber locations 11-1 and 11-2, have terminal devices for telecommunications applications other than just POTS. In particular, subscriber locations 11-1 and 11-2 respectively include video telecommunications terminals 11-11 and 11-21 for the video application. They also include analog telephone sets 11-12 and 11-22 for the POTS application. Subscriber location 11-1 further includes a personal computer 11-14 for data applications, while subscriber location 11-2 further includes ISDN telephone set 11-23 for the ISDN application. Although not explicitly shown in the drawing, each of the aforementioned terminal devices may be connected in parallel with other like devices—colloquially referred to as "extensions." For simplicity, however, the discussion below proceeds on the assumption that only one terminal device of any given type is present at any particular subscriber location.

Intelligent network element, or INE, servers for the various applications illustratively include central office switch 45 for the POTS application; central office switch 75 for the ISDN application; data server 85 for a data application; and video switches 55 and 65 for the video application. Each of these servers has an associated NPA-NNX, where NPA is the so-called numbering plan area, or "area code," and NNX is the so-called exchange. The directory numbers for subscriber locations supported by each server are of the form NPA-NNX-ABCD, where ABCD is a four-digit number assigned to the subscriber location in question. Illustratively, each of the INE servers shown in the drawing has the same NPA—namely 908. Starting from the top of FIG. 2, their respective exchanges are 949, 615, 834, 582 and 957.

Subscriber locations 11-1 and 11-2 could have individual access network connections to the various INE servers in order to obtain access to the various applications supported by those servers. Indeed, just as access network 32 provides direct connections from subscriber locations 12-1 through 12-N to central office switch 45, links 551, 651, 751 and 851 into line ports of INE servers 55, 65, 75 and 85 represent such direct connections from locations (not shown) served by those servers. Instead of such direct connections, however, subscriber locations 11-1 and 11-2 are provided with "routing to intelligence," or RTI.

In particular, outgoing calls from a particular one of these locations—referred to as "RTI subscriber locations"—for each of a plurality of telecommunications applications are delivered to a single point of distribution through which the subscriber location is caused to be connected, as a function of the telecommunications application type, to an appropriate one of the INE servers. To this end, the outputs of video terminal 11-11, telephone set 11-12 and personal computer 11-14 are communicated via (illustratively) individual wire pairs, or "drops," serving terminal 21, and access network 31 to a point of distribution, RTI distributor 410, within an RTI facility 40. Specifically, the outputs of those three terminal devices are packetized by a conventional packet assembler/disassembler, or PAD, (not shown) within serving terminal 21, and it is the resulting packets that are communicated to RTI distributor 410. The outputs of video terminal 11-21 and telephone sets 11-22 and 11-23 are similarly packetized within serving terminal 21 and communicated to RTI distributor 410, again via serving terminal 21 and access network 31. In alternative embodiments, the packetization could be implemented by PADs installed at the subscriber location, in which case a single "drop" between the subscriber location and the serving terminal can be used for communications for all of the terminal devices at that location.

Subscriber location 11-N does not require RTI. Like subscriber locations 12-1 and 12-N, it subscribes only to POTS and is served by central office switch 45. However, the output of its POTS telephone set 11-N2 needs to be in packet form so as to be in conformity with the other traffic handled by serving terminal 21. To this end, the (originally analog) output of telephone set 11-N2 is also packetized, illustratively within the serving terminal. In this sense, subscriber location 11-N is treated as though it were an RTI subscriber location and is hereinafter referred to as such.

Other RTI subscriber locations (not shown) are connected to RTI distributor 410 via respective serving terminals and access networks.

RTI facility 40 is associated with central office switch 45, while further RTI facilities 50, 60, 70 and 80 are associated with video switch 55, video switch 65, central office switch 75 and data server 85, respectively, and have respective links thereto 502, 602, 702 and 802. Potentially, any of the RTI facilities could be the RTI facility to which an RTI subscriber is connected. In practical applications, however, RTI subscribers will typically be connected to an RTI facility associated with a central office switch. Thus, for example, subscriber locations 13-1 through 13-N are provided with RTI via a connection to the RTI facility associated with central office switch 75—namely RTI facility 70—via serving terminal 23 and access network 33. Reasons for having an RTI facility associated with each INE server—even the ones which do not provide direct RTI support for RTI subscribers—will become apparent as this description continues.

RTI distributor 410 has links 402 connecting to line ports of particular ones of the INE servers—namely central office switch 45, video switch 55 and central office switch 75—and it is via such links that connections are made from subscriber locations 11-1 through 11-N to those INE servers. Connections are made to others of the INE servers via their respective RTI facilities as described below.

The INE servers shown in the drawing are illustratively connected to other servers of like kind (not shown) within the network via conventional intra-lata trunks and interexchange carrier trunks 452, 552, 652, 752 and 852 which may connect to one another either directly or via intra-lata and/or interexchange carrier switch points. Additionally, RTI facilities 40, 50, 60, 70 and 80 respectively include RTI collectors 420, 520, 620, 720 and 820 pursuant to the present invention. For the present, it suffices to note that each INE server is connected from at least ones of its output, or trunk, ports to the RTI collector—serving, as will be seen, as a point of collection—within its associated RTI facility. Further, the various RTI collectors are themselves interconnected. Central office switch 45, video switch 55, video switch 65, central office switch 75 and data server 85 are each connected to the RTI collectors within their respective associated RTI facilities via links 453, 553, 653, 753 and 853, respectively. Additionally, ones of links 453 extend directly to trunk ports of at least certain of the INE servers in addition to central office switch 45—namely, video switch 65 and central office switch 75. Moreover, the RTI collectors are connected to other RTI collectors within the network via trunks 403, 503, 603, 703 and 803, respectively. Again, those trunks may be connected to one another directly or via other RTI collectors or network switch points. Additionally, individual ones of the aforementioned trunks can interconnect INE servers at one end with RTI collectors at the other. (As will be seen, communications into and out of RTI collectors are in packetized form so that any server/RTI collector interconnections would have to include appropriate packetizing/de-packetizing circuitry.) The choice of how the various trunkings are set up will depend simply on the expected levels of traffic between various points within the network; the extent to which servers already in place have or have not been provided with associated RTI facilities; etc.

Figure 4:
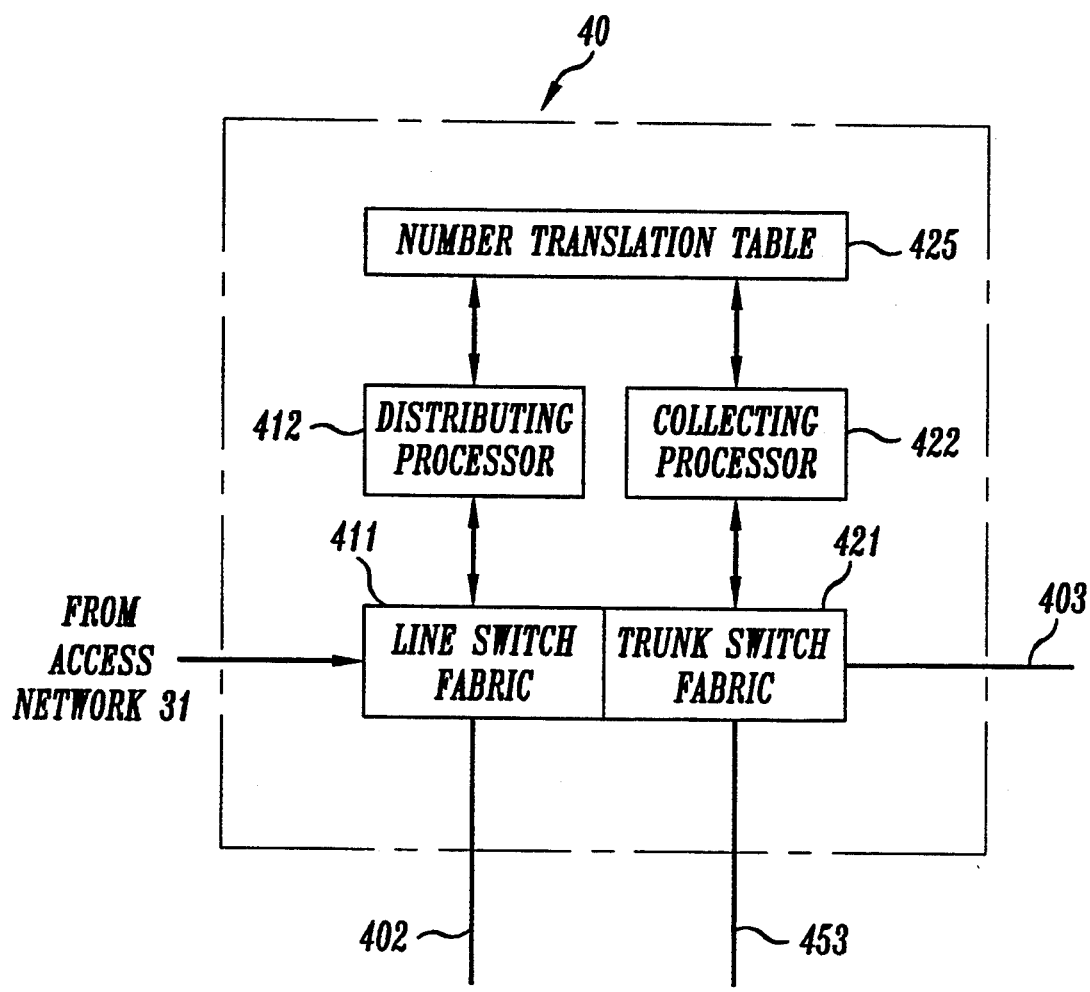
FIG. 4 is a block diagram of one of the routing to intelligence (RTI) facilities used in the network of FIGS. 1 and 2.

FIG. 4 is an illustrative realization of RTI facility 40. RTI facility 40, more particularly, includes line switch fabric 411, distributing processor 412 and number translation table 425 which are the major components of RTI distributor 410 as depicted in FIG. 2. RTI facility 40 further includes trunk switch fabric 421 and collecting processor 422 which along with, again, number translation table 425 are the major components of RTI collector 420 as depicted in FIG. 2. It is via the line and trunk switch fabrics 411 and 421 that the actual connections, in the form of virtual circuits, are made into and out of RTI distributor 410 and RTI collector 420, respectively, under the control of distributing processor 412 and collecting processor 422 which provide the intelligence to determine when and how those connections are to be set up. Number translation table 425 contains data which is used jointly by distributing processor 412 and collecting processor 422 in making those connections.

The other RTI facilities within the network are illustratively of similar design to RTI facility 40 and need not be described in further detail.

The operation of the aforementioned elements will now be described, beginning with a description of number translation table 425, the organization of which is shown conceptually in FIG. 5.

Specifically, number translation table 425 stores RTI routing information for all of the various RTI subscriber locations served by RTI facility 40, although only the information relating to RTI subscriber locations 11-1, 11-2 and 11-N is shown explicitly. Specifically, the table identifies video terminal 11-11, POTS telephone set 11-12 and personal computer 11-14 as being the terminal devices for the video, POTS and data applications, respectively, at RTI subscriber location 11-1. The designations for those terminal devices stored in table 425 correspond to the ÔE$_i$'s of the aforementioned Daugherty patent applications.

Table 425 further specifies an "RTI directory number" and a "server directory number" for each application. The server directory number is the directory number used internally by an INE server in the course of handling calls for a particular subscriber, that number including the server's exchange digits. Note, then, that the server directory numbers for video, POTS and data applications for subscriber location 11-1 are 908-615, 908-949 and 908-957 directory numbers, respectively, which are the NPA-NNX's of INE servers 55, 45 and 85. The server directory number is relevant to such issues as billing and other telephony administration matters.

The RTI directory number, on the other hand, is the directory number used externally in, for example, directing calls to a particular subscriber location. In accordance with the present invention, incoming calls of various application types can be directed to a single directory number, thereby causing them to be delivered to a single point of collection—an RTI collector—associated with a portion of that dialed directory number. That portion of dialed directory number is illustratively the six digits comprising its numbering plan area (or "area code") and exchange. Connections for those calls are thereupon caused to be made from the point of collection to an appropriate INE server, as a function of the telecommunications application type and the directory number in question. Thus as can be seen from FIG. 5, the RTI directory number for all three applications subscribed to from subscriber location 11-1 is the same—908-949-6111—so that, advantageously, calls of all three application types intended for subscriber location 11-1 can be directed to the same directory number.

The column headed "ROUTE TO/OUTGOING" indicates how an outgoing call of each of the application types is to be routed. As noted above, particular ones of links 402 connect RTI distributor 410 directly into line ports of not only its associated INE server—POTS central office switch 45—but also of video switch 55 and ISDN central office switch 75. These have been provisioned because, in this example, there is a sufficient amount of traffic between RTI subscriber locations served by RTI facility 40, on the one hand, and those particular INE servers, on the other hand, to warrant the provisioning and ongoing maintenance of such links. By contrast, there is insufficient traffic between those locations and video switch 65 or data server 85 to warrant a specific link between them. In that situation, outgoing calls are routed via trunks 403 to the RTI facilities 60 and 80 associated with those servers—this being a more economical approach because those trunks can be used to connect RTI facility 40 to a whole multiplicity of other RTI facilities. Thus, as shown in FIG. 5, the ROUTE TO/OUTGOING entries within table 425 for subscriber location 11-1 identify switches 45 and 55 as the entities to which outgoing POTS and video calls are to be routed, while RTI collector 820 of RTI facility 80 is specified as the entity to which outgoing data calls—which are to be served by its associated INE server, data server 85—are routed.

RTI subscriber location 11-2 has two RTI directory numbers. Specifically, the directory number 908-949-7222 is used for its video and POTS applications in accordance with the invention, the video and POTS INE servers being video switch 65 and POTS central office switch 45, respectively. On the other hand, the directory number for the ISDN application for this subscriber location is a directory number supported by central office switch 75—the directory number 908-582-7678—rather than a directory number supported by central office switch 45. Such an arrangement, which is conventionally referred to as "foreign exchange" service, is provisioned at the subscriber's request. For example, the subscriber may have been using the 908-582-7678 number for an extended period of time in the past and may wish to continue to receive ISDN calls at that number even though other calls are received at the 908-949-7222 number. Inasmuch as RTI distributor 410 has direct links 402 to central office switches 45 and 75, it is those servers that are listed in the ROUTE TO/OUTGOING column for location 11-2. There is no such link to video switch 65. Accordingly, that column has RTI collector 620 listed.

Table 425 also shows that the POTS application for telephone set 11-N2 at subscriber location 11-N has the directory number 908-949-8333 and is supported by central office switch 45.

Number translation table 425 also has a column headed "ROUTE TO/INCOMING." The entries in this column indicate how incoming calls are to be routed. In particular, all incoming non-POTS calls directed to a 908-949 RTI directory number will be delivered, in the first instance, to RTI collector 420 via trunks 403 and, depending on the trunking from the originating location, some of the POTS calls will be directed thereto, as well. (The non-RTI POTS calls will be delivered to central office switch 45 directly via one of trunks 452 in the conventional way.) As shown in FIG. 5, POTS and video calls received at RTI collector 420 for the RTI directory numbers 908-949-6111 and 908-949-8333 are routed to central office switch 45, that routing being by way of respective ones of links 453. Video and data calls for that RTI directory number are routed to RTI collectors 520 and 820 since there are no direct links from RTI distributor 420 to video switch 55 or to data server 85.

With respect to incoming calls to RTI directory number 908-949-7222, incoming video and POTS calls are routed, via direct connections, to video switch 65 and central office switch 45.

Incoming calls to 908-582-7678 are not received by RTI facility 40 and, therefore, there is no ROUTE TO/INCOMING entry for that number.

Each RTI facility within the network has its own number translation table similar to table 425. For present illustrative purposes, it is useful to depict, as shown in FIG. 6, a particular one entry of the number translation table within RTI facility 70, that being the entry associated with ISDN telephone set 11-23. For the most part, a number translation table includes entries for locations which are directly connected to the RTI facility in question, such as subscriber locations 13-1 through 13-N in the case of RTI facility 70. However, since the directory number for telephone set 11-23 is a directory number supported by central office switch 75, i.e., a directory number whose NPA-NNX is 908-582, it is necessary for the table of FIG. 6 to include such an entry as well so that incoming calls to 908-582-7628 can be routed appropriately. Outgoing calls from telephone set 11-23 are not handled by RTI facility 70 and, therefore, there is no ROUTE TO/OUTGOING entry for that number.

A further column in the number translation tables is headed "WIRETAP?". The presence of a directory number in this column indicates that a law enforcement agency has obtained a court order authorizing a wire tap for the directory number in question. In the event that either an incoming (outgoing) call is made from (to) such a directory number, the RTI facility will initiate a call to the number specified in the WIRETAP? column—which number terminates at a law enforcement agency's wiretap facility—and will supply the "tapped" conversations over the call thus initiated. FIG. 5 shows that telephone set 11-N2 is currently under a wiretap order, with the communications to and from its directory number being "tapped" and supplied to 908-555-8282. If desired, such wiretapping can be effected for applications other than POTS, e.g., video.

The column headed "FX" (foreign exchange) is explained at a more opportune point hereinbelow.

Particular mention should be made at this point of data server 85. Its inclusion in a network of the type shown in FIGS. 1—2 is wholly optional. Indeed, data server 85 is envisioned by me to be a new kind of server which would serve as a) a network endpoint providing any various information database or other data services to a caller combined with b) a set of telephony-server-type functionalities, such as billing, so that a subscriber location can connect into such a server via any of the mechanisms described above without having had to have been connected through any other INE server, such as a central office switch. An INE server of this type might be referred to as an application server, as compared with a telephony server which is what each of the other INE servers shown in the drawing are.

Figure 8:
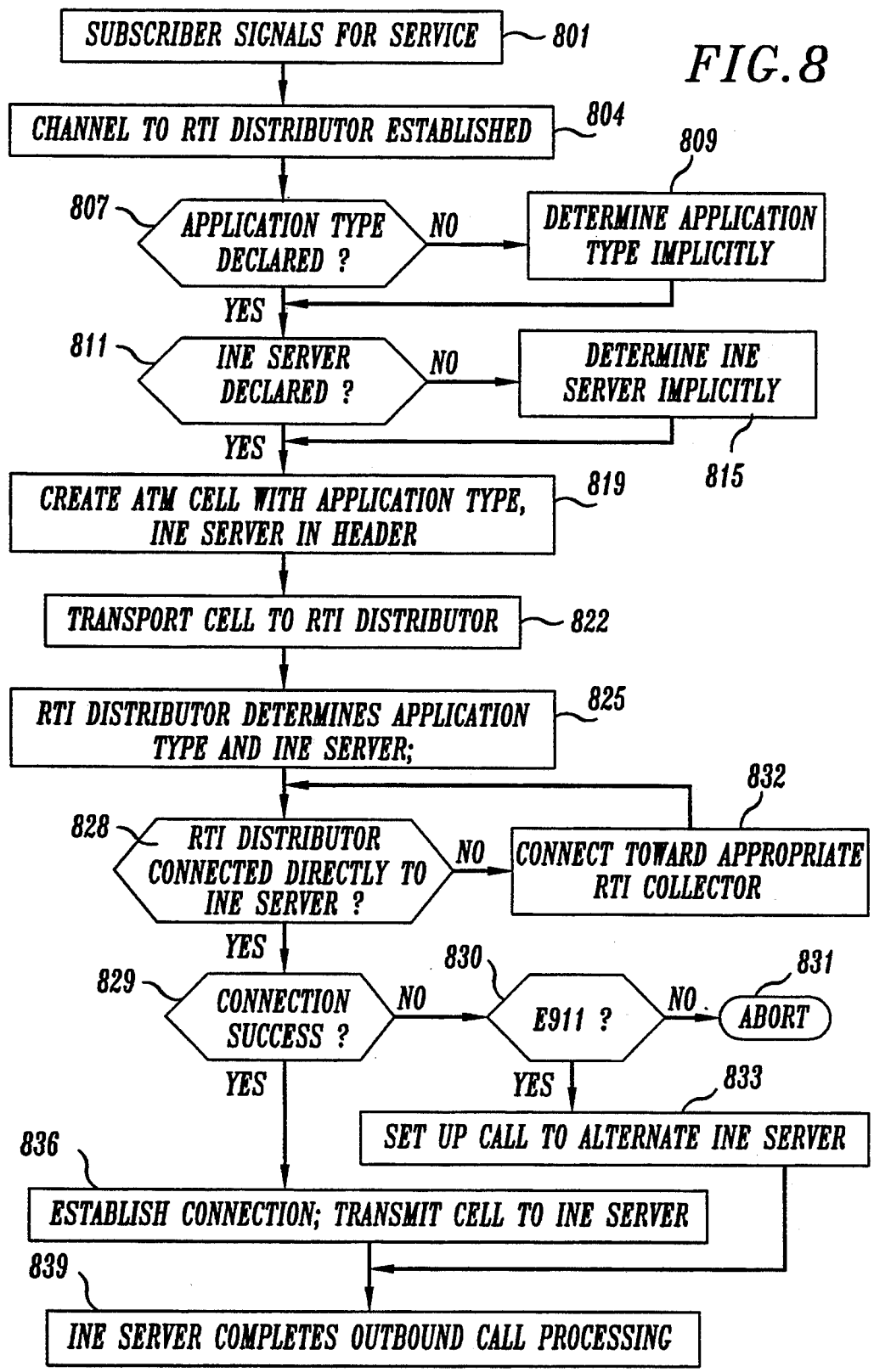
FIG. 8 is a simplified flowchart of the outgoing call processing carried out by the network of FIGS. 1 and 2 in accordance with the invention.

Referring to the flowchart of FIG. 8, consider now the origination of an outgoing call from, for example, RTI subscriber location 11-1. As shown at block 801, the subscriber signals for service by, for example, taking a telephone set off hook or otherwise causing a terminal device to transmit to the serving terminal a signal requesting service. Serving terminal 21 thereupon initiates the setting up of a communications channel between the telephone set and RTI distributor 410 via access network 31 in the manner described in the above-cited Daugherty patent applications (block 804). At the same time, serving terminal 21 determines the application type. On the one hand, the application type may be declared explicitly (block 807). For example, the application type might be declared in a terminal-device-to-serving-terminal message generated automatically by terminal device. Or the application type might be declared by the subscriber—for example, in response to a prompt supplied by the serving terminal. If, on the other hand, the application is not declared explicitly, it is determined implicitly (block 809). Specifically, the application type may be implicit in the type of terminal device requesting service, e.g., a POTS telephone set, or may simply be determined, by default, to be a particular application type, e.g., POTS.

The serving terminal also determines, if it can, the INE server that is to serve the call. More particularly, the INE server that is to serve the call may be explicitly declared (block 811) via one of the mechanisms noted above in connection with the application type or it may be determined implicitly (block 815). The implicit determination may be, for example, as a consequence of a pre-specification, within the serving terminal, of the INE server for the application type in question. Failing any of the foregoing, the INE server is determined by RTI distributor 410 from number translation table 425, as described below.

Figure 7:
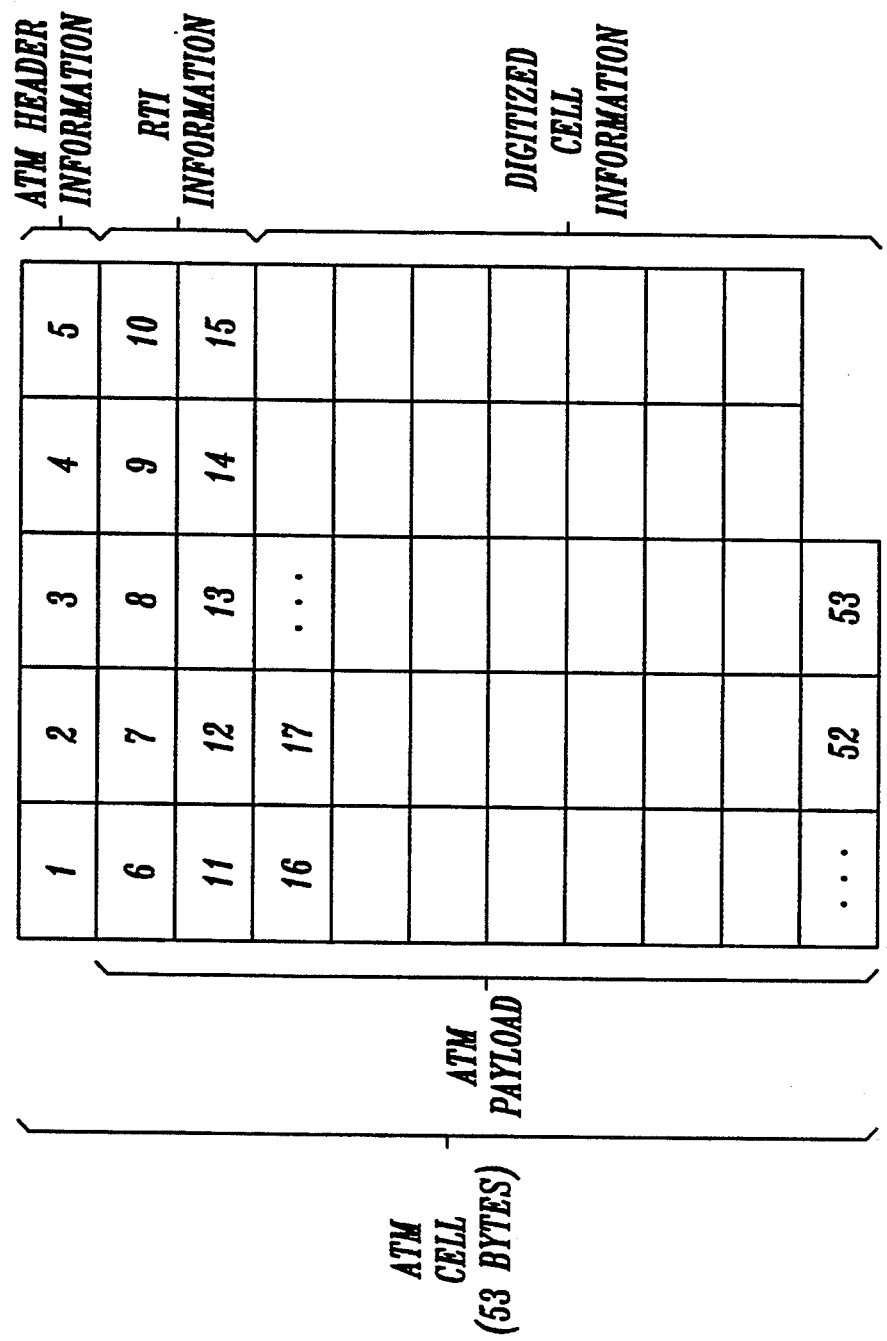
FIG. 7 shows the format of ATM cells communicated with the network of FIGS. 1 and 2.

The serving terminal then creates a data packet (block 420), the structure of which is shown in FIG. 7. The packet illustratively conforms to the standard 53-byte ATM cell envelope format, although any cell design can be used. Specifically, the first five bytes comprise standard ATM header information. The remainder of the 53 bytes contains the cell "payload" beginning with such RTI information as the application type, the INE server, if known, and the terminal device identification, $ÔE_i$.

The cell is then transmitted over access network 31 to RTI distributor 410 (block 822), which thereupon determines the application type and/or the INE server (block 825). As just seen, one or both of these may have been specified in the cell itself. If the application type has not been so specified, a default application type is assumed, e.g., POTS. If an INE server is not specified in the cell, the ROUTE TO/OUTGOING column of number translation table 425 is consulted to determine where the call is to be routed. If number translation table 425 does not contain, for the subscriber location in question, an entry for the application type in question, a default INE server, e.g. central office switch 45, is assumed. This means that, advantageously, it is not mandatory that an entry be made in table 425 for every application type, for every subscriber location, connected to an RTI serving terminal, such as serving terminal 21. As an example, the entries shown in table 425 for one or both of POTS telephone sets 11-12 and 11-N2 could be eliminated, with the result that POTS calls received therefrom would be routed to, for example, central office switch 45 as the default.

Assume that the call is to be connected to an INE server that is directly connected to RTI distributor 410 via one of links 402 (block 828), such as central office switch 75. In this case, distributing processor 412 a) instructs line switch fabric 411 to establish a virtual circuit connecting the incoming channel to an appropriate channel on one of those links 402 and, b) using ATM commands, causes the ATM cell to be transmitted to the INE server over that link (block 836). This assumes (block 829) that the network was, in fact, successful in making the connection (block 829) rather than being unable to do so as the result of equipment problems, cable cuts or the like. It also assumes that the INE server is ATM-compatible. If it is not, an applique or interface (not shown) is provided at the INE server which serves as a "front end" to depacketize the cell and to present the information content thereof in the form expected by the INE server and to perform the opposite function for information directed back to the terminal device.

On the other hand, there may be no direct link from the RTI distributor to the INE server, as is the situation in the case of video switch 65. In that situation (block 832), a connection toward RTI collector 620 is made by having line switch fabric 411 establish a virtual circuit connecting the incoming channel out onto one of trunks 403 via trunk switch fabric 421. The term "toward" is used here to denote the fact that the ultimate connection between RTI collectors 420 and 620 may, itself, be not a direct trunk connection but, rather, involve one or more intermediate RTI collectors. Thus as shown in FIG. 8, the output of block 832 loops back through block 828 until the call has reached the RTI collector (in this example, 620) of an RTI facility (60) whose RTI distributor (610) is directly connected to a line port of the desired INE server (65), per block 828. Such routing through any intermediate RTI collectors would be effectuated within those collectors using conventional numbering plan concepts wherein each such collector would have information about which outgoing trunk ought to be used to forward a call to any particular destination specified. And as before, the connection from the RTI distributor to the INE server is made, assuming that there are no impediments to same (blocks 829 and 836) and, also as before, the cell is transmitted to the INE server.

It is thus seen that through either of the two mechanisms—direct connection from the RTI distributor to the INE server, or trunk connections via the RTI collectors and, ultimately, an RTI distributor—a complete connection is established between the terminal device at the subscriber location and the appropriate INE server.

With this first, service-requesting cell having been communicated to the appropriate RTI server and a connection having been established between the calling terminal device and the INE server, the latter is now in a position to complete outbound call processing (block 839) in any of a number of ways. If the called party is served by that same INE server, the call can be completed either in the conventional way, if the called party is not an RTI subscriber, or via the process set forth in FIG. 9 beginning from block 931 if the called party is an RTI subscriber. If the called party is not served by the same INE server, the call is routed over a respective one of outgoing trunks 452, 552, etc., or via a respective one of RTI collectors 420, 520, etc., those options having been described hereinabove. In the latter case, a channel is set up between the INE server and the RTI collector via one of links 453, 553, etc., the vehicle by which this is done again being ATM commands. It may also be noted that the called "party" may, in actuality, simply be an INE application server somewhere in the network—as opposed to a telephony server—a typical scenario being a call from a subscriber to a server which supplies video on demand. In that case, the outgoing call might be a POTS or ISDN call during which the desired video program is ordered by the caller, and which call is thereafter terminated, followed by an automatic video call back to the subscriber location initiated from the application server.

It may be the case—contrary to what is assumed above—that due to equipment failures, cable cuts, etc., the network is not able to establish a connection from a subscriber location to the desired INE server. This is the "NO" branch leading from block 829. If this is the case, and if the call is a so-called E911 (or other emergency) call, it is desirable to make alternate arrangements.

In particular, as is well known within the United States, E911 is an application wherein a subscriber dialing the digits "911" is connected to an emergency center from which police, fire, ambulance or other emergency services can be requested. Indeed, subscriber location 12-N in FIG. 1 represents such a center. Consider, now, ISDN telephone set 11-23. It is assumed herein that central office switch 75 which serves that telephone set is geographically much more distant from subscriber location 11-2 than is central office switch 45. With that increased geographical separation comes an increased chance of service disruption because, for example, there is that much more opportunity for the one of links 402 connecting RTI distributor 410 to central office switch 75 to be put out of service due, for example, to excavation-related cable cuts or to natural disasters. Additionally, because of the additional call routing involved, the call set-up time may be greater, this being particularly disadvantageous in emergency situations. In accordance with a feature of the invention, however, which I refer to as the "survivability" feature, outgoing calls to particular destinations, such as the E911 emergency application, can, if the situation warrants, be routed from the RTI distributor to an alternate INE server—which may even be one which does not support the type of call being made, e.g., ISDN.

To this end, the table 425 entry associated with ISDN telephone set 11-23 includes an entry in the column headed "E911 SERVER." The E911 SERVER column in the table indicates that E911 calls originating from telephone set 11-23, if they cannot be served by central office switch 75 at any particular time, are to be served by central office switch 45, as an alternate. In particular, if RTI distributor 410 finds that it is unable to establish a connection to central office switch 75, it initiates a message to ISDN telephone set 11-23—e.g., on its display screen—prompting the subscriber, notwithstanding the fact that dial tone from the ISDN central office switch has not been able to be provided, to enter the digits "911" if the call is an emergency call (block 830). If the subscriber does not thereupon enter the digits "911", the attempted call set-up is aborted (block 831). If, however, the digits "911" are entered, RTI distributor 410 takes steps to connect the call through central office switch 45. Since telephone set 11-23 is not normally served by that switch, the latter does not "know" the former, i.e., has no information about it, and it is thus not possible to simply connect telephone set 11-23 to a line port of central office switch 45. Moreover, central office switch 45 is not ISDN-capable. RTI distributor 410 itself is, however, a subscriber of central office switch 45 in that, in addition to links 402, it has a standard telephone line thereto (not shown). Under the conditions postulated, RTI distributor 410 sets up a call between telephone set 11-23 and central office switch 45 (block 833). It does this by a) initiating an E911 POTS call from itself to central office switch 45, b) bridging that call with the incoming call from telephone set 11-23, and c) throughout the process, appropriately depacketizing (packetizing) communications from (to) telephone set 11-23 so as to allow ISDN telephone set 11-23 to communicate with POTS central office switch 45.

No E911 SERVER entries are necessary for any of the other terminal devices listed in number translation table 425 because the other telephone sets are already served by central office switch 45. It is also assumed that the network does not support video, data or other application types for E911. If it did, however, the same considerations could apply in terms of providing the wherewithal to connect such E911 calls to an alternative INE server. It may also be noted that the survivability feature can be provisioned to be invoked for any emergency-type call— not just calls made by dialing "911"—including, for example, so-called lifeline services, security/alarm services, etc.

In preferred embodiments, the RTI distributor will "camp on" to all calls routed through it, thereby being able to, for example, recognize that an ongoing emergency call has been disrupted and thereupon provide for alternate routing of the call.

Figure 9:
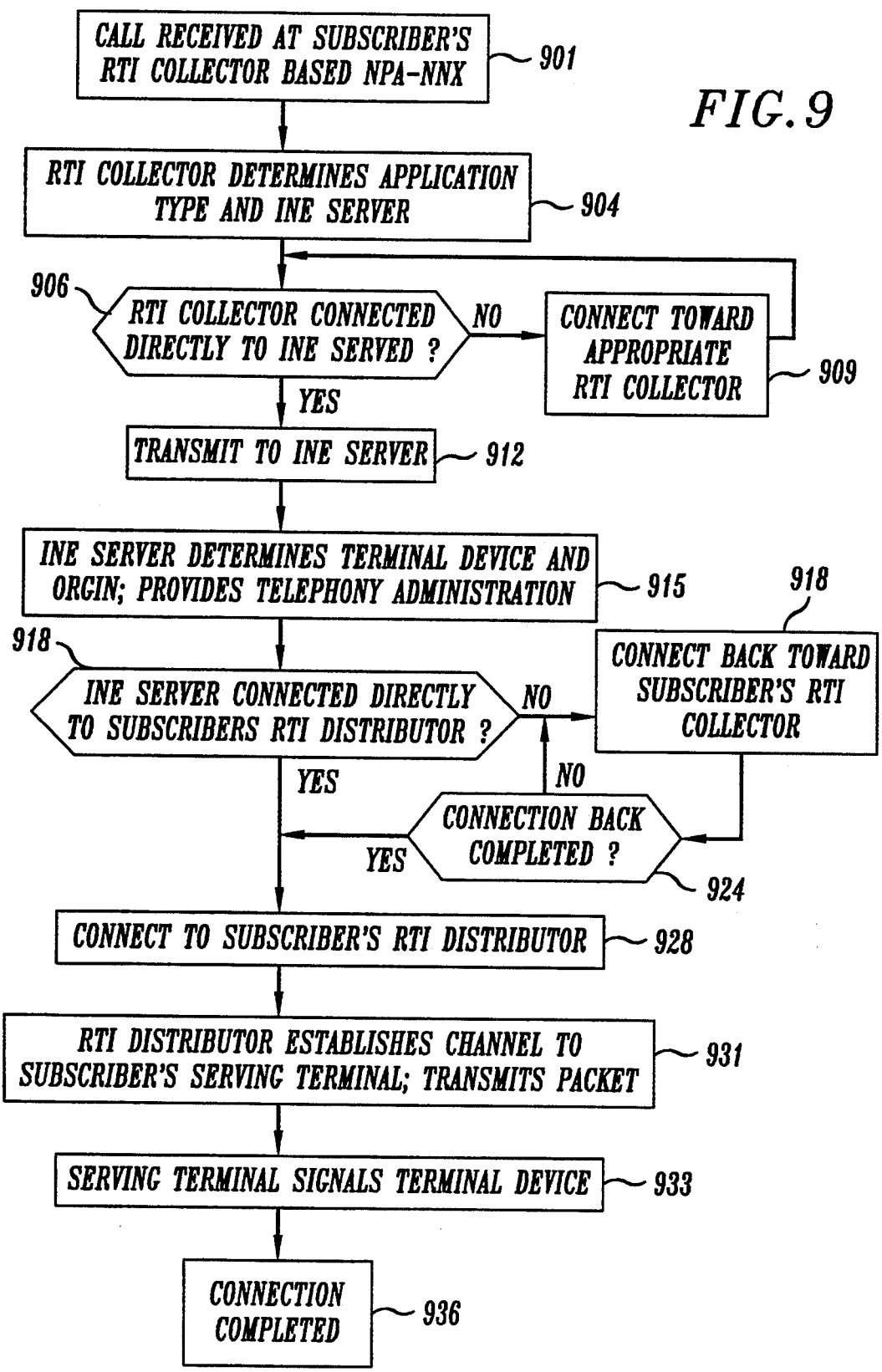
FIG. 9 is a simplified flowchart of the incoming call processing carried out by the network of FIGS. 1 and 2 in accordance with the invention.

Referring to the flowchart of FIG. 9, consider now the receipt of an incoming call to, for example, RTI subscriber location 11-1. All RTI calls directed to a particular directory telephone number are received at the RTI collector associated with the NPA-NNX of that number (block 901) in accordance with the principles of the invention. In this case, it is assumed that the incoming call is an RTI call intended for 908-949-6111, so that the call is received by RTI collector 420. (Again, non-RTI calls to 908-949 numbers are received by central office switch 45 via trunks 452 in the conventional way.) Collecting processor 422 thereupon determines the application type and the appropriate INE server (block 904) either by reference to data contained in the incoming cell, to the extent that such data is provided, or from number translation table 425.

If RTI collector 420 is directly connected to the trunk side of the INE server—as is the case if the server is central office switch 45, video switch 65 or ISDN central office switch 75—collecting processor 422 a) instructs trunk switch fabric 412 to establish a virtual circuit connecting the trunk channel on which the call is being received to an appropriate channel on one of links 453 and, b) using ATM commands, causes the call to be transmitted to the INE server over that link (block 912). On the other hand, there may be no direct connection on the trunk side to the INE server. Thus assume, for example, that the INE server that is to serve the call is video switch 55, for which there is, indeed, no such connection. In this situation, collecting processor 422 a) instructs trunk switch fabric 412 to establish a virtual circuit connecting the trunk channel on which the call is being received back out on another trunk channel toward RTI collector 520 (block 909), either via a direct trunk connection or via one or more intermediate RTI collectors until the call reaches RTI collector 520 (block 906) which (again, at block 912) instructs its own trunk switch fabric (not shown) to a) establish a virtual circuit connecting the incoming channel on one of trunks 503 to a channel on one of links 553, and b) using ATM commands, cause the call to be transmitted to video switch 55.

The INE server that has now received the incoming call identifies from the incoming call data such information as the origin of the call, i.e., the originating directory number, which is used for a number of purposes, such as billing and calling number delivery service; the identity of the immediately prior entity which forwarded the call, as is conventional in packet switching technology generally; and the called directory number. The INE server thereupon provides conventional telephony administration such as determining whether the called directory number is currently "busy," "idle," "ringing," etc. (block 915). If the called terminal device is, in fact, available to receive the call, steps are taken to complete a connection thereto.

In particular, assume that the INE server that is handling the call is central office switch 45. Since the INE server in that case is, in fact, connected directly to the subscriber's RTI distributor 410 via links 402 (block 918), central office switch 45 initiates the setting up of a channel over one of those links to the RTI distributor (block 928)—specifying the called terminal identification—its $\mathrm{\widehat{O}E}_i$—of the aforementioned Daugherty patent applications. The fact that there is no entry in the FX column of number translation table 425 for the terminal devices whose RTI directory number is 908-949-6111—the assumed called number—implicitly means that such devices are connected to the RTI distributor of which that table is a part, namely RTI distributor 410. (The counter example is treated below.) Moreover, the $\mathrm{\widehat{O}E}_i$ includes information which specifies serving terminal 21 as the one to which those terminal devices are connected. RTI distributor 410 can thus simply proceed to a) establish a channel over access network 31 to serving terminal 21 and then transmit the call thereto (block 931).

Serving terminal 21 thereupon signals the terminal device, e.g., by activating its ringer (block 933). The connection is completed upon the subscriber answering the call (block 936) and communication between the calling and called parties can proceed.

On the other hand, the INE server that is handling the call may not be directly connected to RTI distributor 410. Thus assume, for example, that the INE server that is serving the incoming call is video switch 65, for which there is, indeed, no such direct connection. In this situation, connections are made back out through to RTI collector 620 via appropriate trunks and, possibly, intermediate RTI collectors (blocks 922 and 924) until a connection to RTI collector 420 has been made, and then processing continues as before, beginning at block 928.

Consider, now, the FX column of the number translation table of RTI facility 70 as shown in FIG. 6. The fact that there is an entry in that column for ISDN telephone set 11-23 means that that telephone is not directly connected to the RTI distributor of which that table is a part. That is, it is not connected to RTI distributor 710. Thus, in contradistinction to the example given earlier, central office switch 75 should not forward incoming calls for telephone set 11-23 to its own associated RTI distributor. Rather, it should forward them to the RTI distributor to which the subscriber location in question is, in fact, connected. This is readily accomplished by having RTI collector 720 specify to central office switch 75, when a call first comes in, how the call should be routed out the line side of that switch. In the example shown in FIGS. 1-2, the FX entry for ISDN telephone set 11-23 is "DIST 410/D", indicating to central office switch 75 that it has a direct link (as denoted by the "/D") to the called subscriber location and that it should route incoming calls for telephone set 11-23 over its link 402 to RTI distributor 410. The latter then proceeds to complete the connection in the manner described above.

If there were to be no direct connection between central office switch 75 and RTI distributor, then the entry in the FX column for telephone set 11-23 would simply be "DIST 410." That lack of the "/D" notation in the entry means that RTI distributor 710, upon receiving the call, consulting number the number translation table of FIG. 6 and forwarding the call it on to central office switch 75, would instruct central office switch 75 to route the call to its own RTI distributor 710 identifying RTI distributor 410 as the destination. RTI distributor 710 will thereupon cause the call to be routed to RTI distributor 410 via RTI collectors 720 and 420. It will be appreciated that this technique for implementing a foreign exchange feature can be used to provide that feature over great geographic distances without the need for long, and therefore expensive, dedicated connections, as is the case today. Advantageously, then, a subscriber can continue to utilize a particular directory telephone number even while continuing to physically re-locate him/herself over time. For this reason, this aspect of the operation of the network of FIGS. 1—2 can be thought of as a "number portability" feature.

Moreover, this same mechanism could be used to provide a form of personal communications service. A traveling subscriber could be provided with the ability to call in to a local RTI distributor—say the RTI distributor which serves a subscriber location where the traveling subscriber is visiting—and to instruct that local RTI distributor to a) inform the traveling subscriber's "home" RTI facility to cause any incoming calls to the traveling subscriber's directory number to be forwarded, via the mechanisms described above, to the local RTI distributor, just as though the traveling subscriber were being provided with foreign exchange service by his "home" INE server and then, b) to route any such calls received by the local RTI facility through the local RTI distributor to the location where the subscriber is visiting.

The discussion herein has proceeded without explicit reference to SS7 signaling, which is the standard protocol and format for call administration (and database look-up) among network elements. SS7 signaling is accommodated in the network of FIGS. 1—2 by simply treating it as a further telecommunications application, with the SS7 endpoints (signaling interfaces) being treated like separate INE servers.

The foregoing merely illustrates the principles of the present invention, as the following list of some of the possible alternatives and variations demonstrates:

Although the invention is disclosed herein in the context of the North American numbering plan, it is equally applicable to any telecommunications numbering plan.

Although the various INE servers in the network are each shown as having a respective different associated RTI facility, a single RTI facility can be arranged to be associated with two or more INE servers, just as, today, multiple servers are often supported in a single so-called wire center.

Although the various components shown in FIG. 4 can be realized as physically separate entities as the drawing shows, they could equally well be realized in various alternative ways. For example, the two switch fabrics could be one unified switch fabric. Indeed, the functionality of the switch fabrics of an RTI facility could, in actuality, be provided by the switch fabric of the associated INE server, rather than being separate entities. As another variation, the two processors could be one processor providing both the distributor and collector functions. RTI distributor 410 and RTI collector 420 could also be realized as wholly separate entities which share no common components and need not be physically proximate to one another.

The invention is not limited to use in conjunction with the particular types of INE servers and applications shown herein. For example, another type of server/application could be an electronic mail (e-mail) server/application so that, for example, e-mail could be addressed to an RTI directory number and, upon its arrival at the appropriate RTI collector, routed to an e-mail server for "forced-delivery" to the subscriber.

Although serving terminals for residences and small businesses are typically installed in an outdoor pedestal or on a utility pole, the serving terminals shown and described herein could, alternatively, be installed within the subscriber location itself—such as in a basement—so that, in effect, the subscriber terminal provides local area network (LAN) functionality within the subscriber premises.

Additionally, the network of FIGS. 1 and 2 could be arranged to have an embedded network management capability in which diagnostics, testing and performance monitoring could be designed into the various elements of the network and the ATM capabilities available in the network could be used to route all that data to a central telemetry facility.

The discussion hereinabove has tacitly proceeded on the assumption that, in an outgoing call, the calling subscriber has specified the desired endpoint by specifying an endpoint directory number. Indeed, that is envisioned to be the predominant way in which calls will be made. It is possible, however, to allow callers to specify some other "label" for the desired endpoint—such as the name of a desired video-on-demand provider—and leave it to the RTI distributor to look up the directory number in a table which it maintains for this purpose and to insert the directory number in the cell which it forwards on. Moreover, an RTI collector to which calls to a video-on-demand provider are directed—again using that as an example—may route those calls to any of a plurality of identical video-on-demand application servers of that provider on, for example, a round-robin or load-balancing basis, in analogy to the conventional telephony hunt group concept.

It will thus be appreciated that, although the invention is illustrated herein in the context of a specific illustrative embodiment, those skilled in the art will be able to devise numerous alternative arrangements which, although not explicitly shown or described herein, embody the principles of the invention and are within its spirit and scope.

I claim:

1. A method for use in a telecommunications network which includes a plurality of intelligent network element servers supporting respective telecommunications application types, said method comprising the steps of receiving, at a point of collection, incoming calls of any of said application types, but all directed to a particular subscriber location, said respective different ones of said incoming call application types including two of POTS, ISDN, video and data, and routing each of said incoming calls from said point of collection to a particular one of said intelligent network element servers supporting the application type of said each incoming call.

2. The invention of claim 1 comprising the further step of routing each of said incoming calls from said intelligent network element servers to said subscriber location via a point of distribution and a single access link which are associated with said subscriber location.

3. The invention of claim 2 wherein said incoming calls include intelligence carried in data packets, wherein at least ones of said packets have information identifying the application type of the respective call, and wherein said point of collection carries out said routing based on said information.

4. The invention of claim 2 wherein said points of distribution and collection are co-located with one another.

5. The invention of claim 4 wherein said points of distribution and collection are co-located with a telecommunications central office.

6. The invention of claim 1 wherein said calls include intelligence carried in data packets and wherein at least ones of said packets have information identifying said particular one of said intelligent network element servers.

7. The invention of claim 1 wherein said routing step includes the steps of responding to receipt of a particular one of said incoming calls by determining its application type, and determining said particular intelligent network element server from a number translation table based on said determined application type and on said particular subscriber location.

8. The invention of claim 1 wherein said calls include intelligence carried in data packets conforming to an asynchronous transfer mode (ATM) format.

9. The invention of claim 8 wherein said routing step includes the communication of ATM commands between said point of distribution and said intelligent network element servers.

10. The invention of claim 1 wherein said routing step includes the establishing of a virtual circuit between said point of collection and said one intelligent network element server.

11. The invention of claim 1 comprising the further step of routing each of said incoming calls from said particular intelligent network element server to said subscriber location via said point of collection and via a point of distribution and a single access link which are associated with said subscriber location, when there is no direct link between said particular server and said point of distribution.

12. The invention of claim 1 wherein said routing step includes the step of routing ones of said incoming calls to said particular intelligent network element server via another point of collection to which that server is directly connected, when there is no direct link from the first-recited point of collection to that server.

13. Apparatus for use in a telecommunications network which includes a plurality of intelligent network element servers supporting respective telecommunications application types, said apparatus including a point of collection which comprises means for receiving incoming calls of any of said application types, but all directed to a particular subscriber location, said respective different ones of said incoming call application types including two of POTS, ISDN, video and data, and means for routing each of said incoming calls from said point of collection to a particular one of said intelligent network element servers supporting the application type of said each incoming call.

14. The apparatus of claim 13 further comprising means for routing each of said incoming calls from said intelligent network element servers to said subscriber location via a point of distribution and a single access link which are associated with said subscriber location.

15. The apparatus of claim 14 wherein said points of distribution and collection are co-located with one another.

16. The apparatus of claim 15 wherein said points of distribution and collection are co-located with a telecommunications central office.

17. The apparatus of claim 13 wherein said incoming calls include intelligence carried in data packets, wherein at least ones of said packets have information identifying the application type of the respective call, and wherein said means for routing carries out said routing based on said information.

18. The apparatus of claim 13 wherein said calls include intelligence carried in data packets and wherein at least ones of said packets have information identifying said particular one of said intelligent network element servers.

19. The apparatus of claim 13 wherein said means for routing responds to receipt of a particular one of said incoming calls by determining its application type, and by thereupon determining said particular intelligent network element server from a number translation table based on the determined application type and on said particular subscriber location.

20. The apparatus of claim 13 wherein said calls include intelligence carried in data packets conforming to an asynchronous transfer mode (ATM) format.

21. The apparatus of claim 20 wherein said routing means, in the carrying out of said routing, communicates ATM commands between said point of collection and said intelligent network element servers.

22. The apparatus of claim 13 wherein said routing means, in the carrying out of said routing, establishes of a virtual circuit between said point of collection and said particular intelligent network element server.

23. The apparatus of claim 13 further comprising means for routing said incoming calls from said particular intelligent network element server to said subscriber location via said point of collection and via a point of distribution and a single access link which are associated with said subscriber location, when there is no direct link between said particular server and said point of distribution.

24. The apparatus of claim 13 further comprising means for routing ones of said incoming calls to said particular intelligent network element server via another point of collection to which that server is directly connected, when there is no direct link from the first-recited point of collection to that server.

* * * * *